United States Patent
Wang et al.

(10) Patent No.: US 10,094,710 B2
(45) Date of Patent: Oct. 9, 2018

(54) BACKLIGHT DETECTION DEVICE AND DETECTION METHOD

(71) Applicants: BOE TECHNOLOGY GROUP CO., LTD., Beijing (CN); BOE (HEBEI) MOBILE DISPLAY TECHNOLOGY CO., LTD., Hebei (CN)

(72) Inventors: Jiayin Wang, Beijing (CN); Dongnian Han, Beijing (CN); Zhen Wu, Beijing (CN); Xing Li, Beijing (CN); Guowen Yang, Beijing (CN)

(73) Assignees: BOE TECHNOLOGY GROUP CO., LTD., Beijing (CN); BOE (HEBEI) MOBILE DISPLAY TECHNOLOGY, CO., LTD., Hebei (CN)

( * ) Notice: Subject to any disclaimer, the term of this patent is extended or adjusted under 35 U.S.C. 154(b) by 67 days.

(21) Appl. No.: 15/173,899

(22) Filed: Jun. 6, 2016

(65) Prior Publication Data

US 2016/0377480 A1 Dec. 29, 2016

(30) Foreign Application Priority Data

Jun. 25, 2015 (CN) .......................... 2015 1 0359452

(51) Int. Cl.
*H01J 3/14* (2006.01)
*G01J 1/42* (2006.01)
(Continued)

(52) U.S. Cl.
CPC .............. *G01J 1/4228* (2013.01); *G01J 1/44* (2013.01); *G08B 21/18* (2013.01); *G08B 25/08* (2013.01)

(58) Field of Classification Search
CPC .............. G01J 2001/4247; G01J 3/506; G09G 2360/145; G09G 2320/0233
See application file for complete search history.

(56) References Cited

U.S. PATENT DOCUMENTS

| 2008/0283737 A1* | 11/2008 | Wang | ......................... G01J 1/02 250/252.1 |
| 2014/0192351 A1* | 7/2014 | Lin | ........................... G01J 1/04 356/218 |

FOREIGN PATENT DOCUMENTS

| CN | 102591043 A | 7/2012 |
| CN | 202853883 U | 4/2013 |

(Continued)

OTHER PUBLICATIONS

The First Chinese Office Action dated Jun. 29, 2017, Appln. No. 201510359452.3.

*Primary Examiner* — Thanh Luu
(74) *Attorney, Agent, or Firm* — Ladas & Parry LLP

(57) ABSTRACT

An embodiment of the present disclosure provides a backlight detection device, comprising: a carrier plate, having a backlight detection region for carrying a backlight to be detected; a light property detection plate with a plurality of brightness sensors arranged thereon, configured for detecting light properties of different regions of a backlight to be detected which is positioned in the backlight detection region; and a data processing unit, in signal connection with the plurality of brightness sensors, configured for judging whether the light property of the backlight to be detected is qualified or not according to a plurality of brightness signals of different regions of the light source to be detected which are detected by the plurality of brightness sensors.

12 Claims, 4 Drawing Sheets

(51) Int. Cl.
*G01J 1/44* (2006.01)
*G08B 21/18* (2006.01)
*G08B 25/08* (2006.01)

(56) References Cited

FOREIGN PATENT DOCUMENTS

| | | |
|---|---|---|
| CN | 202947859 U | 5/2013 |
| CN | 104697750 A | 6/2015 |
| TW | 201428251 A | 7/2014 |

\* cited by examiner

BACKLIGHT DETECTION DEVICE AND DETECTION METHOD

TECHNICAL FIELD

Embodiments of the present disclosure relate to a backlight detection device and a detection method.

BACKGROUND

As for a liquid crystal display device, since liquid crystal per se does not emit light, a light source, for example, a backlight, is needed to be arranged at an incident side of a liquid crystal display panel, to realize a display function of the liquid crystal display panel. A function of the backlight is to provide a surface light source with high brightness and uniform distribution for the liquid crystal display panel, so as to enable the liquid crystal display panel to normally display an image. Therefore, in the liquid crystal display device, a performance of the backlight has a great influence on performance of the liquid crystal display device. Light properties (such as brightness and uniformity) and electric properties (such as a bright spot, a dark spot and a transmission spot) of the backlight are important factors for evaluating the performance of the backlight. Therefore, usually the light and electric properties of the backlight require to be detected before the backlight and the liquid crystal display panel are assembled.

At current, when the light and electric properties of the backlight are detected, generally a luminance meter is adopted to detect the light properties of the backlight, and the electric property of the backlight is detected in a naked eye observation manner. When a luminance meter is adopted to detect the light properties of the backlight, firstly, the luminance meter is used to detect brightnesses of different regions of the backlight spot by spot, then a data processing unit processes the brightnesses of different regions of the backlight detected by the luminance meter, so as to determine whether the light properties of the backlight are qualified or not. However, spot by spot detection is demanded when the luminance meter is adopted to detect the brightnesses of different regions of the backlight, which leads to a longer time for detecting the light properties of the backlight, and lower efficiency in detecting the light and electric properties of the backlight.

SUMMARY

An embodiment of the present disclosure provides a backlight detection device, comprising: a carrier plate, having a backlight detection region for carrying a backlight to be detected; a light property detection plate with a plurality of brightness sensors arranged thereon, configured for detecting light properties of different regions of a backlight to be detected which is positioned in the backlight detection region; and a data processing unit, in signal connection with the plurality of brightness sensors, configured for judging whether the light property of the backlight to be detected is qualified or not according to a plurality of brightness signals of different regions of the light source to be detected which are detected by the plurality of brightness sensors.

Another embodiment of the present disclosure provides a detection method adopting the backlight detection device according to claim 1, comprising: placing a backlight to be detected on a backlight detection region of a carrier plate and lighting the backlight to be detected; positioning a light property detection plate directly above the backlight to be detected, wherein a plurality of brightness sensors detect brightnesses of different regions of the backlight to be detected simultaneously; and by a data processing unit, judging whether light property of the backlight to be detected is qualified or not according to a plurality of brightness signals of different regions of the backlight to be detected which are detected by the plurality of brightness sensors.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Embodiments of the present disclosure provide a backlight detection device and a backlight detection method adopting same, capable of effectively improving efficiency in detecting light and electric properties of a backlight to be detected.

Figure 1:
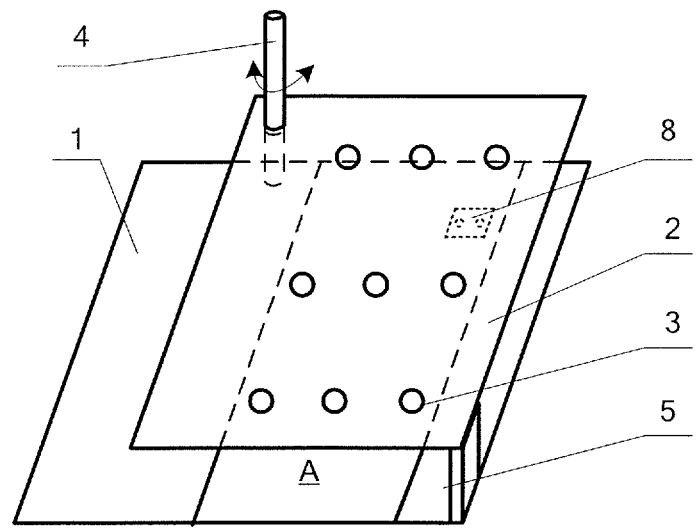
FIG. 1 is a structural schematic diagram of a backlight detection device according to an embodiment of the present disclosure.
Figure 4:
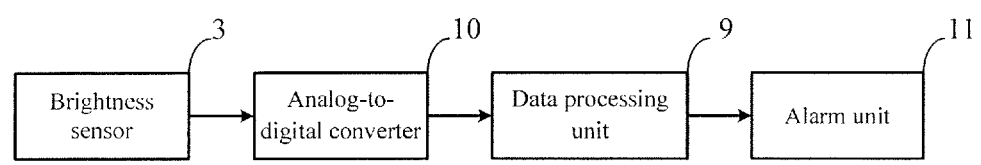
FIG. 4 is a schematic diagram of a part of components of a backlight according to an embodiment of the present disclosure.

Referring to FIG. 1 and FIG. 4, the backlight detection device provided by the embodiment of the present disclosure comprises a carrier plate 1, having a backlight detection region for carrying a backlight to be detected; a light property detection plate 2 with a plurality of brightness sensors 3 arranged thereon, configured for detecting light properties of different regions of the backlight to be detected which is positioned in the backlight detection region; a data processing unit 9, in signal connection with the plurality of brightness sensors 3 respectively, configured for judging whether the light property of the backlight to be detected is qualified or not according to the brightnesses of different regions of the backlight to be detected which are detected by the plurality of brightness sensors 3. During detection, the backlight to be detected is placed in the backlight detection region A on the carrier plate 1; during detection, the light property detection plate 2 is positioned directly above the backlight to be detected, and the light property detection plate 2 is for example parallel with an light exiting surface of the backlight to be detected. The plurality of brightness sensors 3 are, for example, uniformly distributed on the light property detection plate 2.

When the backlight detection device provided by the embodiment of the present disclosure is used to detect the light and electric property of the backlight to be detected, the backlight to be detected is placed on the carrier plate 1 and is lighted; then the light property detection plate 2 is moved to a position directly above the backlight to be detected, the light property detection plate 2 is parallel with the light exiting surface of the backlight to be detected, and the plurality of brightness sensors 3 on the light property detection plate 2 begin to detect the brightnesses of different regions of the backlight to be detected simultaneously; and then the data processing unit 9 determines whether the light properties such as brightness and uniformity of the backlight to be detected according to the brightnesses of different regions of the backlight to be detected which are detected by the plurality of brightness sensors 3.

In summary, in the backlight detection device provided by the embodiment of the present disclosure, the plurality of bright sensors 3 are adopted to simultaneously detect the brightnesses of different regions of the backlight to be detected, and the data processing unit 9 is adopted to judge whether the light property of the backlight to be detected is qualified or not according to the brightnesses of different regions of the backlight to be detected which are detected by the plurality of brightness sensors 3, so as to detect the optical properties of the backlight. Compared with spot by spot detection on the light properties of the backlight to be detected in prior art, time for detecting the light properties of the backlight to be detected is saved, thus effectively improving efficiency in detecting the light and electric property of the backlight to be detected.

In addition, in the backlight detection device provided by the embodiment of the present disclosure, because the plurality of bright sensors 3 are adopted to simultaneously detect the brightnesses of different regions of the backlight to be detected, the efficiency in detecting the light properties of the backlight to be detected can be improved. light properties of all kinds of backlights can be detected by the backlight detection device provided by the embodiment of the present disclosure. Compared with the prior art in which the light properties of the backlight are detected in a sampling manner, the backlight detection device provided by the embodiment of the present disclosure can avoid a low quality assembled liquid crystal display device caused by missed detection of a backlight, thus improving a yield rate of the assembled liquid crystal display device.

It is noted that the number of the brightness sensors 3 on the light property detection plate 2 can be determined according to a size of the backlight to be detected. For example, the number of the brightness sensors 3 is at least 4. For example, if the size of the backlight to be detected is greater than 1.5 inches, the number of the brightness sensors 3 is 9; if the size of the backlight to be detected is smaller than 1.5 inches, the number of the brightness sensors 3 is 5. If the backlight to be detected has an even larger size, the number of the brightness sensors 3 should be greater than or equal to 13.

When the light properties of the backlight to be detected are detected, the light property detection plate 2 is positioned directly above the backlight to be detected, and is parallel with the backlight to be detected. A distance between the light property detection plate 2 and an light exiting surface of the backlight to be detected is for example lower than 30 cm so as to prevent an inaccurate brightness value detected by the brightness sensors 3 due to an overlarge distance between the light property detection plate 2 and the backlight to be detected, thus improving accuracy and reliability in detecting the light properties of the backlight to be detected.

In above embodiment, when detection on the light properties of the backlight to be detected is finished, the light property detection plate 2 is moved away from the position directly above the backlight to be detected, then electric property of the backlight to be detected is detected in a naked eye observation manner. Compared with the prior art in which the electric properties of the backlight cannot be detected until the backlight to be detected is detached from a light property detection platform after detection on the light properties is finished, the embodiment saves time for detecting the light and electric properties of the backlight to be detected, and further improving the efficiency in detecting the light and electric properties of the backlight to be detected. There are many moving manners for the light property detection plate 2. For example, the following three manners can be adopted.

Manner I

Referring to FIG. 1, on the carrier plate 1, a pillar 4 and a support block 5 are correspondingly arranged at two opposite sides of the backlight detection region respectively. A side edge of the light property detection plate 2 corresponding to the pillar side of the backlight detection region is provided with a rotary via hole. The light property detection plate 2 is sleeved on the pillar 4 by the rotary via hole, and the light property detection plate 2 can rotate around the pillar 4. During detection, the side edge of the light property detection plate 2 opposite to the side edge provided with the rotary via hole can rest on the support block 5. For example, the pillar 4 is arranged on the right side of the backlight detection region in FIG. 1, the support block 5 is arranged on the left side of the backlight detection region in FIG. 1; when it is necessary to detect light properties of the backlight to be detected, the backlight to be detected is placed on the backlight detection region A of the carrier plate 1 and is lighted; then the light property detection plate 2 rotates around the pillar 4 along a clockwise direction shown by an arrow in FIG. 1, so that the light property detection plate 2 is rotated to the position directly above the backlight to be detected, and the side edge of the light property detection plate 2 opposite to the side edge provided with the rotary via hole rests on the support block 5; then the plurality of brightness sensors 3 on the light property detection plate 2 detect the brightnesses of different regions of the backlight to be detected simultaneously to realize the detection on the light properties of the backlight to be detected; after the detection on the light properties of the backlight to be detected is finished, the light property detection plate 2 rotates around the pillar 4 along a counterclockwise direction shown by an arrow in FIG. 1, so that the light property detection plate 2 goes away from the position directly above the backlight to be detected. The support block 5 is arranged in order to prevent that the plurality of brightness sensors 3 on the light property detection plate 2 are not on a same plane due to a gravity influence on the light property detection plate 2, thus improving the accuracy in detecting the light properties of the backlight to be detected.

Manner II

Figure 2:
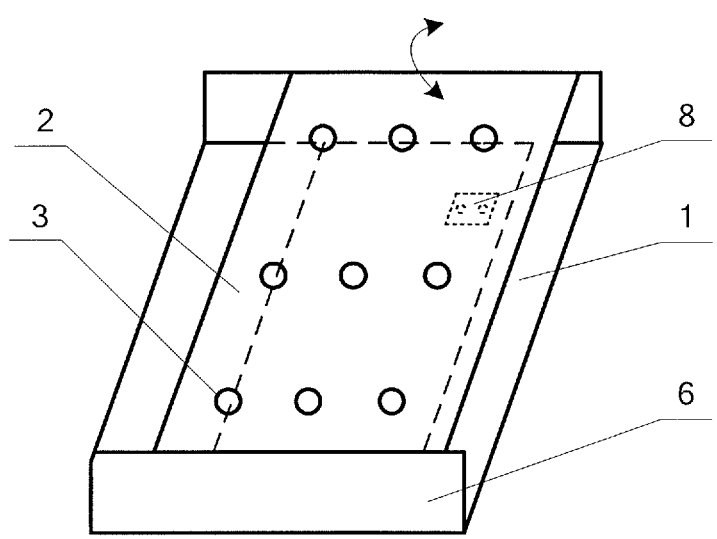
FIG. 2 is a structural schematic diagram of another backlight detection device according to an embodiment of the present disclosure.

Referring to FIG. 2, one side of the light property detection plate is rotatably connected with a side edge of the carrier plate 1. During operation, the backlight to be detected is placed on the backlight detection region A of the carrier plate 1 and is lighted; then the light property detection plate 2 rotates around the side edge of the carrier plate 1 along a downward direction shown by an arrow in FIG. 2, so that the light property detection plate 2 comes to a position directly above the backlight to be detected; then a plurality of brightness sensors 3 on the light property detection plate 2 detect the brightnesses of different regions of the backlight to be detected simultaneously to realize the detection on the light properties of the backlight to be detected; after the detection on the light properties of the backlight to be detected is finished, the light property detection plate 2 rotates around the side edge of the carrier plate 1 along an upward direction as shown by an arrow in FIG. 2, so that the light property detection plate 2 goes away from the position directly above the backlight to be detected.

In order to prevent a case that the plurality of brightness sensors 3 on the light property detection plate 2 are not in the same plane when the light property detection plate 2 comes to the position directly above the backlight to be detected, for example, the upper side edge of the light property detection plate 2 is rotatably connected with an upper side edge of the carrier plate 1 in FIG. 2, and a lower side edge of the carrier plate 1 is provided with a support plate 6. During operation, when the light property detection plate 2 comes to the position directly above the backlight to be detected, the lower side of the light property detection plate 2 opposite to the upper side connected with the carrier plate 1 rests on the support plate 6, so as to enable respective brightness sensors 3 on the light property detection plate 2 to be in the same plane, thus improving the accuracy in detecting the light properties of the backlight to be detected.

Manner III

Figure 3:
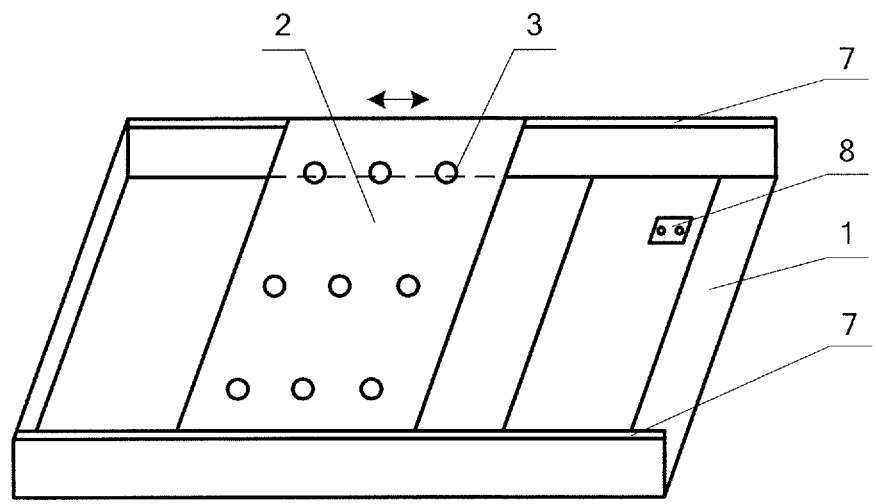
FIG. 3 is a structural schematic diagram of a further backlight detection device according to an embodiment of the present disclosure.

Referring to FIG. 3, two parallel and opposite guide rails 7 are arranged on the carrier plate 1. The light property detection plate 2 is slidably mounted on the two guide rails 7. During operation, the backlight to be detected is placed on the backlight detection region A of the carrier plate 1 and is lighted; then the light property detection plate 2 slides to the right side of FIG. 3 along the guide rails 7, so that the light property detection plate 2 slides to the position directly above the backlight to be detected; then the plurality of brightness sensors 3 on the light property detection plate 2 detect the brightnesses of different regions of the backlight to be detected simultaneously to realize the detection on the light properties of the backlight to be detected; after the detection on the light properties of the backlight to be detected is finished, the light property detection plate 2 slides to the left side of FIG. 3 along the guide rails 7, so that the light property detection plate 2 goes away from the position directly above the backlight to be detected.

It is noted that, referring to FIG. 3, a baffle plate can be arranged on the left side of the guide rails 7. After the detection on the light properties of the backlight to be detected is finished, and when the light property detection plate 2 slides to the left side of FIG. 3 along the guide rails 7, the baffle plate can prevent the light property detection plate 2 from sliding out of the guide rails 7, and therefore, damage to the brightness sensors 3 caused by the fact that the light property detection plate 2 slides out of the guide rails 7 can be prevented.

With further reference to FIG. 1, FIG. 2 and FIG. 3, in order to conveniently light the backlight to be detected, the backlight detection device provided by the embodiment of the present disclosure further comprises a pressure switch 8 configured for connecting the backlight to be detected with a power source. The pressure switch 8 is positioned in a backlight detection region A of the carrier plate 1. For example, the backlight to be detected is placed in the backlight detection region A of the carrier plate 1 and an anode and a cathode of the backlight to be detected are in contact with the pressure switch 8, and therefore, the backlight is powered on and lighted. The backlight to be detected is connected with the power source by the pressure switch 8. Compared with prior art in which the anode and cathode of the backlight to be detected are connected with connecting wires of the power source in a welding manner, the backlight detection device provided by the embodiment can prevent instable connection between the anode and cathode of the backlight to be detected and the connecting wire of the power source caused by infirm welding, thus improving brightness stability of the backlight to be detected and improving accuracy in detecting the light and electric properties of the backlight; in addition, the backlight to be detected is connected with the power source by the pressure switch 8, which can prevent damage to the anode and cathode of the backlight to be detected which is caused by that the anode and the cathode of the backlight to be detected are connected with the connecting wire of the power source by a welding manner, and therefore, reduce an influence on subsequent use of the backlight.

In the backlight detection device provided by the embodiment of the present disclosure, referring to FIG. 4, an analog-to-digital converter 10 is arranged between the plurality of brightness sensors 3 and the data processing unit 9. The analog-to-digital converter 10 is used for converting analog signals transmitted from the plurality of brightness sensors 3 into digital signals and sending the digital signals to the data processing unit 9. For example, the plurality of brightness sensors 3 transmit the analog signal of the brightnesses of the backlight to be detected which are detected by the respective brightness sensor 3 to the analog-to-digital converter 10, the analog-to-digital converter 10 converts the respective analog signals into a corresponding digital signals, and sends the digital signals to the data processing unit 9; the data processing unit 9 judges whether the light property of the backlight to be detected is qualified or not according to the digital signals transmitted from the analog-to-digital converter 10. According to the backlight detection device provided by the embodiment of the present disclosure, the analog-to-digital converter 10 converts the analog signals of the brightness of the backlight detected by the brightness sensors 3 into the digital signals, then the digital signals are transmitted to the data processing unit 9. Compared with a manner in which the brightness sensors 3 directly transmit the analog signals to the data processing unit 9, the backlight detection device provided by the embodiment can improve transmission reliability and stability of the signals, and increase a signal transmission speed, thus further improving the accuracy in detecting the light properties of the backlight to be detected, and further improving the efficiency in detecting the light properties of the backlight to be detected.

In order to facilitate an operator timely picking out an unqualified backlight, with further reference to FIG. 4, the backlight detection device further comprises an alarm unit 11. The alarm unit 11 is in signal connection with the data processing unit 9; if the data processing unit 9 determines that the light properties of the backlight are unqualified according to the digital signal transmitted from the analogto-digital converter 10, the data processing unit 9 sends a command to the alarm unit 11 so that the alarm unit 11 sends an alarm. Due to such a design, through alarming of the alarm unit 11, the operator is informed that the backlight being detected right now is unqualified, and can conveniently pick out the unqualified backlight. In this way, the unqualified backlight is prevented from being assembled into a liquid crystal display device, and a yield rate of the assembled liquid crystal display device is further improved.

In addition, the alarm unit 11 can comprise a buzzer and an indication lamp. If the data processing unit 9 determines that the light properties of the backlight to be detected are unqualified according to the digital signals transmitted from the analog-to-digital converter 10, the data processing unit 9 sends a command to the alarm unit 11 so that the alarm unit 11, so that the buzzer and the indication lamp send an alarm that the backlight being detected right now is unqualified. In this way, the operator can timely pick out unqualified backlight conveniently and a yield rate of the assembled liquid crystal display device is improved.

The indication lamp can comprise a green indication lamp and a red indication lamp. If the data processing unit 9 determines that the light properties of the backlight to be detected are unqualified according to the digital signals transmitted from the analog-to-digital converter 10, the red indication lamp is lighted; and if the data processing unit 9 determines that the light property of the backlight to be detected is qualified according to the digital signals transmitted from the analog-to-digital converter 10, the green indication lamp is lighted.

Figure 5:
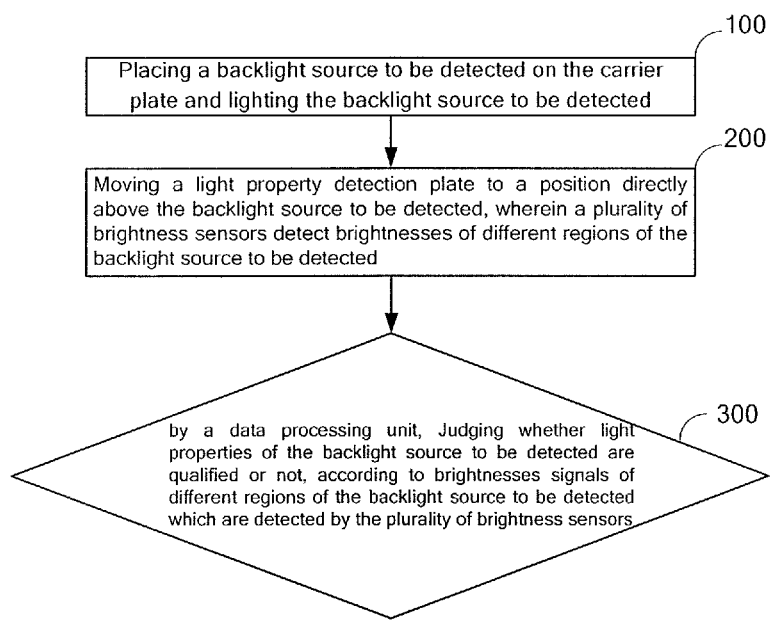
FIG. 5 is a flow chart of a detection method for a backlight according to an embodiment of the present disclosure.

Referring to FIG. 5, an embodiment of the present disclosure further provides a detection method for a backlight adopting the backlight detection device in above technical solution, and the detection method for the backlight includes:

Step 100: placing a backlight to be detected on a backlight detection region A and lighting the backlight to be detected;

Step 200: moving a light property detection plate to a position directly above the backlight to be detected, wherein a plurality of brightness sensors detect brightnesses of different regions of the backlight to be detected simultaneously;

Step 300: by a data processing unit, judging whether a light property of the backlight to be detected is qualified or not according to brightness signals of different regions of the backlight to be detected which are detected by the plurality of brightness sensors.

If the data processing unit determines that the light property of the backlight to be detected is qualified, a subsequent detection operation can be performed, and if the data processing unit determines that the light property of the backlight to be detected is unqualified, then the backlight to be detected is picked out.

Because the detection method for the backlight provided by the embodiment of the present disclosure adopts the backlight detection device provided by the above embodiment to detect light and electric properties of the backlight to be detected, the backlight detection device provided by the embodiment of the present disclosure uses the plurality of brightness sensors to detect different regions of the backlight to be detected so as to realize the detection on the light property of the backlight to be detected. Compared with spot by spot detection on the light property of the backlight to be detected in prior art, the detection method for the backlight provided by the embodiment of the present disclosure saves time for detecting the light property of the backlight to be detected, thus effectively improving efficiency in detecting the light and electric properties of the backlight to be detected.

Figure 6:
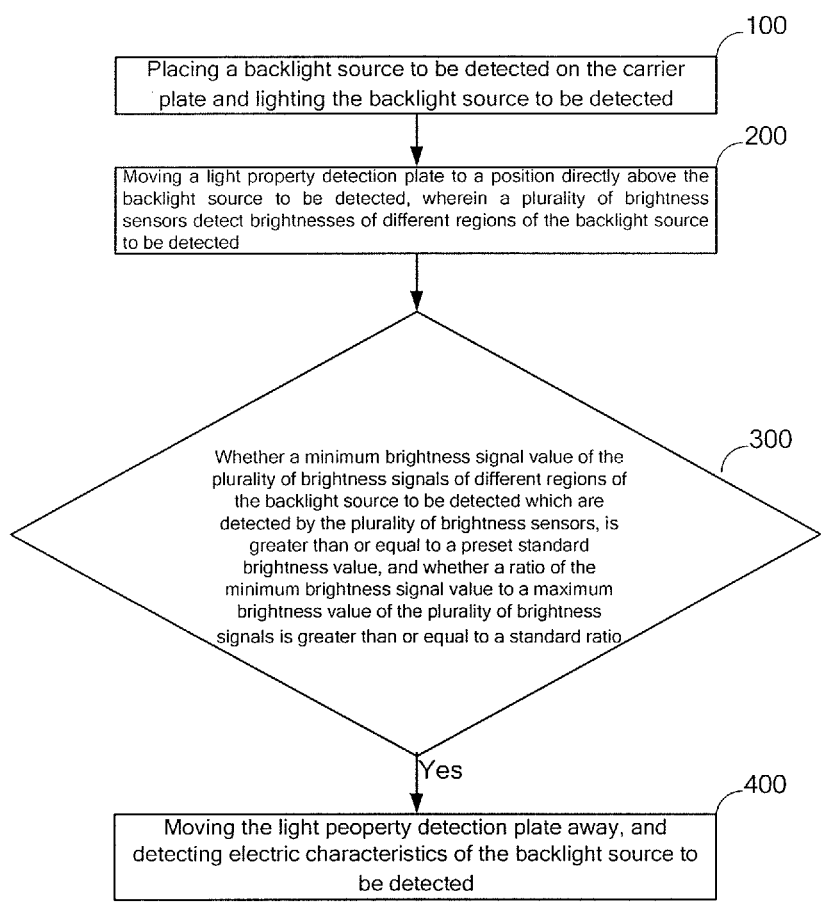
FIG. 6 is a flow chart of another detection method for a backlight according to an embodiment of the present disclosure.

Referring to FIG. 6, in above embodiment, the step 300, for example, includes:

Judging whether the light property of the backlight to be detected is qualified by the data processing unit 9 according to brightness signals of different regions of the backlight to be detected which are detected by the plurality of brightness sensors. For example, if a minimum brightness signal in the brightness signals of different regions of the backlight to be detected which detected by the plurality of brightness sensors is greater than or equal to a preset standard brightness value, and a ratio of the minimum brightness signal to a maximum brightness signal value in the brightness signals is greater than or equal to a standard ratio, then the data processing unit 9 determines that the light property of the backlight to be detected is qualified and output a signal indicating a qualified light property ; otherwise, the data processing unit 9 determines that the light property of the backlight to be detected are unqualified and output a signal indicating an unqualified light property.

For example, if the number of the brightness sensors is 9, the 9 brightness sensors can detect brightnesses of 9 regions of the backlight to be detected; the data processing unit can acquire 9 brightness signals; the data processing unit compares a minimum brightness signal value of the 9 brightness signals with a standard brightness signal value, if the minimum brightness signal value of the 9 brightness signals is greater than or equal to a standard brightness signal value, then the data processing unit 9 determines that the brightness property of the backlight to be detected is qualified; otherwise the data processing unit 9 determines that the brightness property of the backlight to be detected is unqualified; the data processing unit compares a ratio of the minimum brightness signal value to a maximum brightness signal value of the 9 brightness signals with a standard ratio, if the ratio of the minimum brightness signal value to the maximum brightness signal value of the 9 brightness signals is greater than or equal to the standard ratio, then the data processing unit 9 determines that a light uniformity property of the backlight to be detected is qualified; otherwise the data processing unit 9 determines that the light uniformity property of the backlight to be detected is unqualified; if the brightness and light uniformity properties are both qualified, the data processing unit 9 determines that the light property of the backlight to be detected is qualified and output a signal indicating a qualified light property; otherwise, the data processing unit 9 determines that the light properties of the backlight to be detected are unqualified and output a signal indicating a light property unqualified.

For example, the data processing unit 9 can convert the brightness signals of different regions of the backlight to be detected which are detected by the brightness sensors 3 into voltage signals by operation, one voltage value corresponds to one brightness value; then the data processing unit 9 determines whether a minimum voltage value in the voltage values is greater than or equal to a standard voltage value, and whether a ratio of the minimum voltage value to a maximum voltage value in the voltage values is greater than or equal to a standard ratio; if the data processing unit determiners that the minimum voltage value in the voltage values is greater than or equal to the standard voltage value, and the ratio of the minimum voltage value to the maximum voltage value in the voltage values is greater than or equal to the standard ratio, then the data processing unit 9 determines that the light property of the backlight to be detected is qualified and output a signal indicating a qualified light property.

With further reference to FIG. 6, after the step 300, the detection method for the backlight provided by the embodiment of the present disclosure further includes:

Step 400: moving the light property detection plate away from a position directly above the backlight to be detected if the data processing unit determines that the light property of the backlight to be detected is qualified, and detecting electric property of the backlight to be detected.

The invention claimed is:

1. A backlight detection device, comprising:
   a carrier plate, having a backlight detection region for carrying a backlight to be detected;
   a light property detection plate with a plurality of brightness sensors arranged thereon, configured for detecting light properties of different regions of a backlight to be detected which is positioned in the backlight detection region; and
   a data processing unit, in signal connection with the plurality of brightness sensors, configured for judging whether the light property of the backlight to be detected is qualified or not according to a plurality of brightness signals of different regions of the backlight to be detected which are detected by the plurality of brightness sensors,
   wherein, the data processing unit is further configured for determining the light property of the backlight to be detected is qualified if a minimum brightness signal value of the plurality of brightness signals of different regions of the backlight to be detected which are detected by the plurality of brightness sensors is greater than or equal to a preset standard brightness value, and a ratio of the minimum brightness signal value to a maximum brightness signal value of the plurality of brightness signals is greater than or equal to a standard ratio; otherwise, determining that the light property of the backlight is unqualified.

2. The backlight detection device according to claim 1, wherein the plurality of brightness sensors are uniformly distributed on the light property detection plate.

3. The backlight detection device according to claim 1, wherein relative position of the light property detection plate and the carrier plate are changeable.

4. The backlight detection device according to claim 3, wherein one side of the light property detection plate is rotatably connected with the carrier plate.

5. The backlight detection device according to claim 3, wherein the carrier plate is provided with two parallel and opposite guide rails, and the light property detection plate is slidably arranged on the two guide rails.

6. The backlight detection device according to claim 1, further comprising a pressure switch arranged in the backlight detection region of the carrier plate, wherein the pressure switch is configured for controlling an energization state of the backlight to be detected.

7. The backlight detection device according to claim 1, wherein an analog-to-digital converter is arranged between the brightness sensors and the data processing unit, the analog-to-digital converter being configured for converting analog signals transmitted from the plurality of brightness sensors into digital signals, and transmitting the digital signals to the data processing unit.

8. The backlight detection device according to claim 7, wherein the backlight detection device further comprises an alarm unit, and the alarm unit being in signal connection with the data processing unit; and
   in a case that the data processing unit determines that the light properties of the backlight to be detected are unqualified according to the digital signals transmitted from the analog-to-digital converter, the data processing unit sends a command to the alarm unit so that the alarm unit sends an alarm.

9. A backlight detection device, comprising:
   a carrier plate, having a backlight detection region for carrying a backlight to be detected;
   a light property detection plate with a plurality of brightness sensors arranged thereon, configured for detecting light properties of different regions of a backlight to be detected which is positioned in the backlight detection region; and
   a data processing unit, in signal connection with the plurality of brightness sensors, configured for judging whether the light property of the backlight to be detected is qualified or not according to a plurality of brightness signals of different regions of the backlight to be detected which are detected by the plurality of brightness sensors,
   wherein the carrier plate is provided with a pillar and a support block, the pillar and the support block are positioned on two opposite sides of the backlight detection region, the light property detection plate is rotatably connected to the pillar, the light property detection plate is configured to rotate in a plane substantially parallel to the carrier board, and the light property detection plate is detachably connected to the support block.

10. The backlight detection device according to claim 9, wherein the light property detection plate is provided with a rotary via hole, and the light property detection plate is sleeved on the pillar through the rotary via hole.

11. A detection method adopting a backlight detection device, the backlight detection device comprising:
   a carrier plate, having a backlight detection region;
   a light property detection plate with a plurality of brightness sensors arranged thereon, configured for detecting light properties of different regions of a backlight to be detected which is positioned in the backlight detection region; and
   a data processing unit, in signal connection with the plurality of brightness sensors, configured for judging whether the light property of the backlight to be detected is qualified or not according to a plurality of brightness signals of different regions of the backlight to be detected which are detected by the plurality of brightness sensors,
   the detection method comprising:
   placing a backlight to be detected on the backlight detection region of the carrier plate and lighting the backlight to be detected;
   positioning the light property detection plate directly above the backlight to be detected, wherein the plurality of brightness sensors detect brightnesses of different regions of the backlight to be detected simultaneously; and
   by the data processing unit, judging whether light property of the backlight to be detected is qualified or not according to a plurality of brightness signals of different regions of the backlight to be detected which are detected by the plurality of brightness sensors,
   wherein the by the data processing unit, judging whether light property of the backlight to be detected is qualified or not according to a plurality of brightness signals of different regions of the backlight to be detected which are detected by the plurality of brightness sensors, includes:

if a minimum brightness signal value of the plurality of brightness signals of different regions of the backlight to be detected which are detected by the plurality of brightness sensors is greater than or equal to a preset standard brightness value, and a ratio of the minimum brightness signal value to a maximum brightness signal value of the plurality of brightness signals is greater than or equal to a standard ratio, determining the light property of the backlight to be detected is qualified by the data processing unit; otherwise, determining that the light property of the backlight is unqualified.

12. The detection method for the backlight according to claim 11, wherein after that by a data processing unit, judging whether light property of the backlight to be detected is qualified or not according to brightness signals of different regions of the backlight to be detected which are detected by the plurality of brightness sensors, the detection method for the backlight further comprises:

moving the light property detection plate away from a position directly above the backlight to be detected if the data processing unit determines that the light property of the backlight to be detected is qualified, and detecting electric property of the backlight to be detected.

* * * * *